United States Patent
Morishita

(10) Patent No.: US 7,425,804 B2
(45) Date of Patent: Sep. 16, 2008

(54) LAMP DRIVE DEVICE OF PROJECTOR

(75) Inventor: Isaya Morishita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 41 days.

(21) Appl. No.: 11/725,481

(22) Filed: Mar. 20, 2007

(65) Prior Publication Data
US 2007/0222396 A1 Sep. 27, 2007

(30) Foreign Application Priority Data
Mar. 22, 2006 (JP) .............................. 2006-079300

(51) Int. Cl.
*H05B 37/02* (2006.01)
*G03B 21/20* (2006.01)

(52) U.S. Cl. .................... 315/308; 315/209 R; 315/246; 315/360; 353/85

(58) Field of Classification Search ............. 315/209 R, 315/224–226, 246–247, 291, 302, 307–308, 315/360; 353/85
See application file for complete search history.

(56) References Cited
U.S. PATENT DOCUMENTS

| 6,333,607 B1 * | 12/2001 | Yamamoto et al. .......... 315/307 |
| 6,747,422 B2 * | 6/2004 | Yamamoto et al. .......... 315/307 |
| 7,111,944 B2 * | 9/2006 | Morishita ..................... 353/85 |
| 7,247,996 B2 * | 7/2007 | Morishita .................... 315/247 |
| 2003/0197478 A1 * | 10/2003 | Kito ............................ 315/291 |
| 2004/0183463 A1 * | 9/2004 | Sun et al. .................... 315/224 |
| 2006/0038503 A1 * | 2/2006 | Hung .......................... 315/224 |
| 2006/0175984 A1 * | 8/2006 | Okamoto et al. ............ 315/307 |

FOREIGN PATENT DOCUMENTS

JP    08-273865    10/1996

* cited by examiner

*Primary Examiner*—Thuy Vinh Tran
*Assistant Examiner*—Tung X Le
(74) *Attorney, Agent, or Firm*—Pillsbury Winthrop Shaw Pittman LLP

(57) ABSTRACT

A projector includes a lamp drive circuit which drives a lamp, and a lamp drive current detection unit which detects the lamp drive current. Based upon the lamp drive current which is detected, the lamp drive circuit controls the lamp drive current by PWM control, so as to drive the lamp at constant power. A control unit detects the pulse width of this PWM control signal for the lamp several times, after a constant time period has elapsed from when the power supply is turned ON, and includes a lamp shorted out decision unit which decides that the lamp is shorted out, if all of these pulse widths which have thus been detected are less than or equal to a predetermined width.

5 Claims, 4 Drawing Sheets

FIG.3

| | operation | time | (state #1) 0~60SEC first and second times after power turned ON | (state #2) after 60 sec first time after power supply turned ON | (state #3) after 60 sec second time after power supply turned ON |
|---|---|---|---|---|---|
| S1 | permit illumination of lamp | | ○ | × (short circuit) | ○ |
| S2 | check illumination of lamp | | × (short circuit) | ○ | × (short circuit) |
| | processing: | | × | forbid illumination of lamp → wait 30 sec → retry | forbid illumination of lamp → blink LED |

LAMP DRIVE DEVICE OF PROJECTOR

CROSS REFERENCE

This Nonprovisional application claims priority under 35 U.S.C. § 119(a) on Patent Application No. 2006-79300 filed in Japan on Mar. 22, 2006, the entire contents of which are hereby incorporated by reference.

BACKGROUND OF THE INVENTION

The present invention relates to a lamp drive device of a projector such as a liquid crystal projector or the like.

With a prior art projector, a high voltage is applied between two electrodes of a lamp (for example a mercury lamp) and an arc is generated. Due to generation of this arc, a lamp drive current flows through the lamp, and this causes light to be emitted. However, since with such a lamp for a projector the gap between the electrodes is narrow, accordingly very occasionally, after the current is cut off, the mercury causes a short circuit (a bridge short). On the other hand, generally, in order to keep the output of the lamp constant, constant power control is performed at its rated output. Accordingly sometimes, even though the mercury has caused a bridge short, the power continues to flow while the constant power continues to be maintained. In this type of case, there is a possibility that this will lead to the fault that the lamp drive circuit gets into an overheated state.

In order to solve the problem described above, in Japanese Laid-Open Patent Publication Heisei 8-273865, there is proposed a lamp drive circuit which reliably turns the lamp supply voltage OFF when the lamp has become incapable of lighting up. According to this circuit, it is possible to prevent the drive circuit being damaged due to the lamp supply voltage.

However, this lamp drive circuit disclosed in Japanese Laid-Open Patent Publication Heisei 8-273865 described above is not capable of solving the shorting problem between the electrodes due to bridge shorting by the mercury within the lamp and the like.

The objective of the present invention is to provide a lamp drive device of a projector which controls the projector lamp by constant power control, and which is capable of reliably deciding that the electrodes within the lamp have shorted out, thereby being able to protect the circuit.

SUMMARY OF THE INVENTION

The lamp drive device of a projector according to the present invention includes a lamp which projects light towards an image formation unit, and a lamp power supply unit which supplies a lamp drive current to the lamp. A switching element is connected in series with the lamp. The magnitude of the lamp drive current is detected by a lamp drive current detection circuit. Furthermore, this lamp drive device also includes: a lamp drive circuit which, based upon the output of the lamp drive current detection circuit, ON/OFF drives the switching element with a PWM control signal, so that the lamp is driven at constant power; a lamp shorted out decision circuit which, based upon the PWM control signal, decides whether or not the lamp is in a shorted out state; and a display section which displays the shorted out state. And the lamp shorted out decision circuit includes: a pulse width detection unit which detects the pulse width of the PWM control signal after the driving of the lamp has been started; a lamp drive ON/OFF unit which, if the pulse width detected by the pulse width detection unit is less than or equal to a predetermined width, stops the driving of the lamp, and thereafter starts driving of the lamp for a second time; and a decision unit which, after the driving of the lamp by the lamp drive ON/OFF unit has been started for a second time, decides that the lamp is in the lamp shorted out state, if the pulse width detected by the pulse width detection unit is less than or equal to a predetermined width.

When this pulse width is small, then the lamp drive circuit makes the lamp drive current large. And the abovementioned predetermined width corresponds to a lamp drive current of a predetermined magnitude, in other words to the current value when the lamp is in the shorted out state.

Typically when, after the power supply is turned ON, the state that the pulse width is less than or equal to the predetermined width is detected, and when thereafter, even though the supply of the lamp drive current has been started for a second time, the above described state is detected again, then a decision is made that the lamp is in the shorted out state.

BRIEF DESCRIPTION OF THE DRAWINGS

FIG. 3 is a figure showing a table for setting the operation of a control unit.

DETAILED DESCRIPTION OF THE INVENTION

Figure 1:
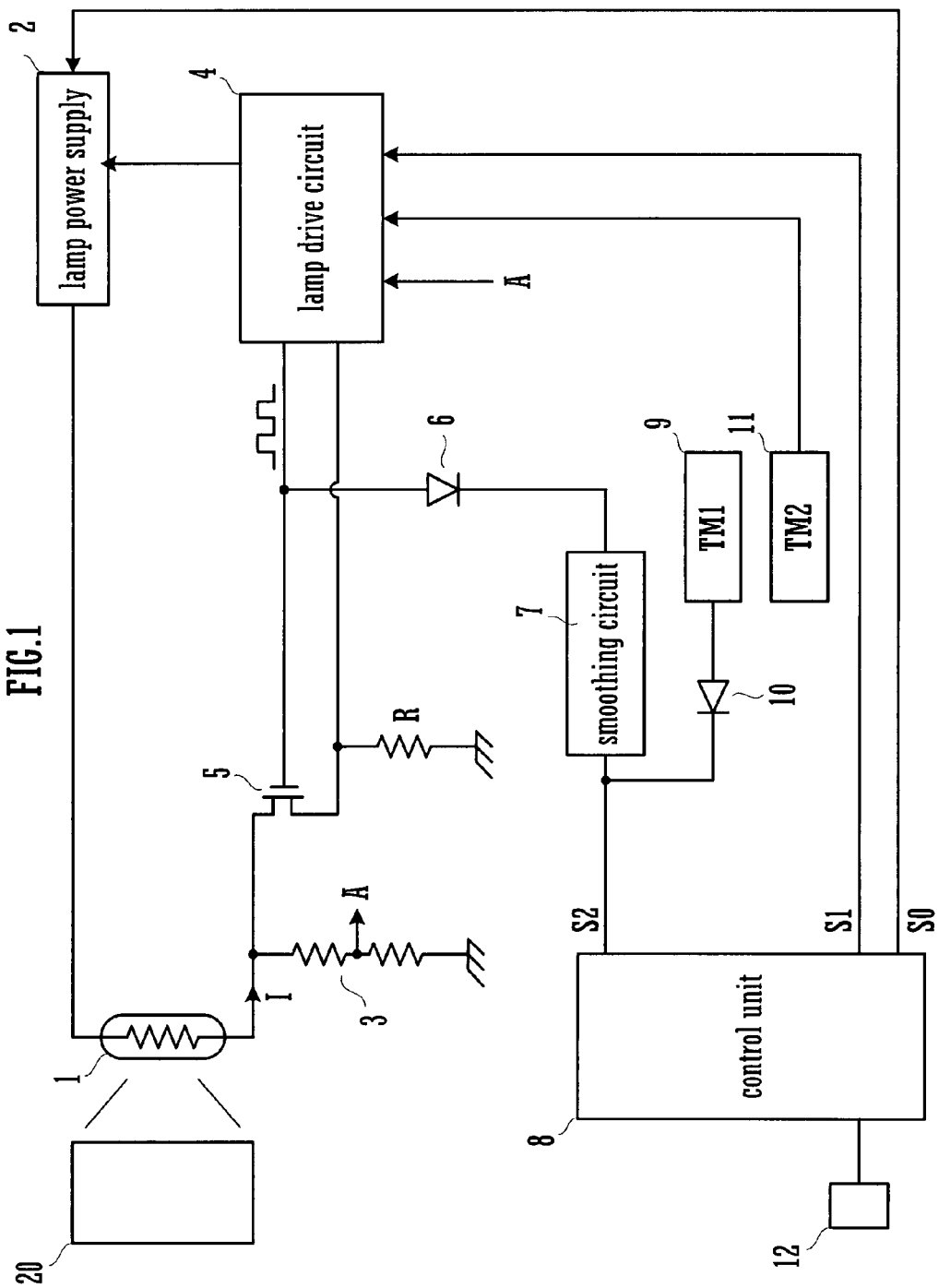
FIG. 1 is a schematic block diagram of a projector incorporating a lamp drive device which is an embodiment of the present invention.

FIG. 1 is a schematic block diagram of a projector incorporating a lamp drive device which is an embodiment of the present invention;

A mercury lamp 1 (hereinafter termed the lamp) is connected to a lamp power supply circuit 2, and a lamp drive current I is supplied from the lamp power supply circuit 2. An image formation unit 20 which includes a color filter and a liquid crystal panel is disposed in front of the lamp 1. Light which has passed through this image formation unit 20 arrives at a screen (not shown in the figures) which is positioned further forward, and thereby an image is displayed upon that screen. The lamp 1 is driven at constant power. In other words, the lamp drive current I is detected by a shunt resistor R, which is a lamp drive current detection circuit, and this detection value is inputted to a lamp drive circuit 4. Furthermore, the lamp drive current I is PWM controlled by a switching element 5, to a control terminal of which a PWM control signal is supplied from the lamp drive circuit 4. Moreover, the lamp drive current I is detected by a resistive voltage divider circuit 3, whose detected value is inputted to the lamp drive circuit 4. When the lamp 1 comes to the end of its life, the voltages at both of its ends become high, and the voltage at this time is detected by the resistive voltage divider circuit 3, which notifies the lamp drive circuit 4 of this fact.

With the above structure, this lamp drive circuit 4 always detects the lamp drive current I with the shunt resistor R so as to drive the lamp 1 at its rated power level, and controls the PWM control signal based upon this detected value. In other words, it performs control so as to shorten the pulse width of the PWM control signal if the value of the lamp drive current I becomes higher, and so as to lengthen the pulse width of the PWM control signal if the value of the lamp drive current I becomes lower. Thus, if shorting out of the lamp takes place, since the lamp drive current I abruptly increases, accordingly the pulse width of the PWM control signal for driving the lamp 1 at constant power abruptly becomes shorter.

FIG. 2 shows this situation.

Figure 2A:
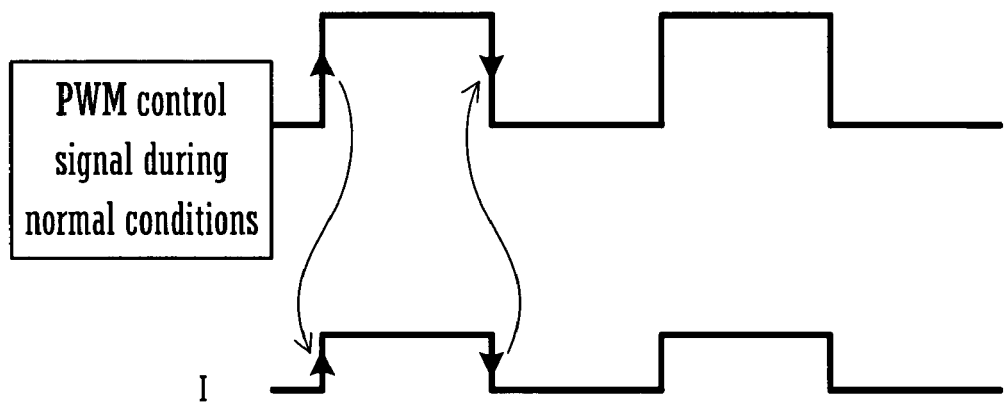
FIGS. 2A and 2B are figures showing waveforms of a PWM control signal when constant power control is being performed.
Figure 2B:
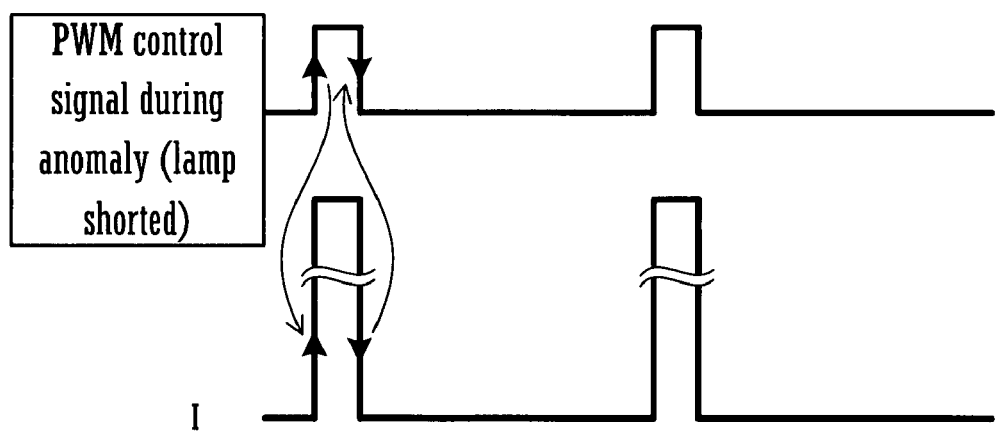

FIG. 2A shows the pulse width of the PWM control signal and the waveform of the lamp drive current I during normal conditions (the stationary state). And FIG. 2B shows the pulse width of the PWM control signal and the waveform of the lamp drive current I when the lamp is short circuited (the anomalous state). As shown in the figure, during constant power control, the lamp drive current I rises along with the rise of the PWM control signal, the power is calculated based upon the elapsed time from this rise of the current I, and the PWM control signal drops at the time point that the power reaches the constant power. The potential level of the PWM control signal is always fixed.

According to the control described above, the pulse width of the PWM control signal is correlated with the magnitude of the lamp drive current I. Thus, in this embodiment, lamp short circuiting is decided upon according to this pulse width.

In FIG. 1, the PWM control signal is outputted to a smoothing circuit 7 via a diode 6. In this smoothing circuit 7, the PWM control signal is smoothed in an analog manner. Accordingly, when the pulse width of the PWM control signal is short, the level of the smoothed output becomes low, while when the pulse width is long, the level of the smoothed output becomes high. This smoothed output is inputted to the control unit 8 as a detection signal S2 for the lamp drive current I.

The output of a timer 9 is connected to the output side of the smoothing circuit 7 via a diode 10. This timer 9 is started when the power supply is turned ON or the like and the lamp 1 is driven, and sets its output to "H" for just one minute. Accordingly, until 1 minute has elapsed from when the lamp 1 is first driven, the output of the smoothing circuit 7 is masked so that the detection signal S2 which is inputted to the control unit 8 is forcibly set to "H". Due to the operation of this timer 9, when the lamp 1 is first driven (i.e. when the power supply is turned ON or the like), for one minute thereafter, detection of the presence or absence of shorting out of the lamp is ignored.

A timer 11 is used for applying a high voltage for a period of about 8 seconds when the lamp 1 is turned on. In other words, during a period of 8 seconds from directly after the power supply is turned ON, the lamp power supply circuit 2 applies a high voltage to the lamp 1.

The control unit 8 outputs a lamp drive signal S0 to the lamp power supply circuit 2, and outputs a lamp illumination permission signal S1 to the lamp drive circuit 4. If this lamp illumination permission signal S1 is "H" level, then illumination of the lamp 1 is permitted, while if it is "L" level then illumination of the lamp 1 is not permitted. A LED 12 is connected to the control unit 8, and, when the control unit 8 decides that the lamp has shorted out, it blinks this LED 12.

FIG. 3 is a table showing the operation of the control unit 8 after the power supply is turned ON.

When the power supply is turned ON, the system starts in a state #1. At this time, the timer 9 starts to count one minute. The signal S1 becomes "H" level and the lamp 1 is permitted to light up. Due to this, the driving of the lamp 1 is started. During this one minute interval, the control unit 8 does not make any decision as to whether or not the lamp 1 is shorted out, since the signal S2 is "H" level.

When the one minute interval has elapsed, the system transits to a state #2. In this state #2, the signal S2 is raised or lowered based upon the output of the smoothing circuit 7. The control unit 8 detects the pulse width of the PWM control signal by this signal S2. And, if the signal S2 is at a level which indicates shorting out of the lamp 1, the control unit 8 sets the signal S1 to a level which forbids illumination of the lamp 1. Due to this, driving of the lamp 1 is stopped, and the lamp 1 is turned out. The system waits for a period of 30 seconds, and then transits to the state #1 for a second time. In this manner, the control unit 8 performs turning ON and OFF of the driving for the lamp 1.

When the state #1 has elapsed for a second time, the system transits to a state #3. In this state #3 as well, just as in the state #2, the signal S2 is raised or lowered based upon the output of the smoothing circuit 7. At this time, if the signal S2 is at a level which indicates shorting out of the lamp 1, the signal S1 is set to a level which forbids illumination of the lamp 1. Furthermore, error processing is performed, and the LED 12 is blinked.

As described above, since the signal S2 is masked for a period of one minute after the power supply has been turned ON, accordingly, during this time period, the control unit 8 does not perform its decision as to shorting out of the lamp 1. Furthermore, after this period of one minute has elapsed, if the signal S2 is at a level which indicates shorting out of the lamp 1, then the control unit 8 stops the driving of the lamp 1. Moreover, the control unit 8 waits for 30 seconds after this stoppage, and then starts the driving of the lamp 1 again, and, during a further period of one minute, again does not perform its decision as to shorting out of the lamp 1. And thereafter (in other words after a period of two minutes has elapsed from when the power supply is turned ON) the control unit 8 makes its decision as to shorting out of the lamp 1 for a second time. At this time, if the signal S2 is at a level which indicates shorting out of the lamp 1, then the control unit 8 blinks the LED 12, which indicates that a lamp failure error has occurred.

By the control unit 8 performing control in this manner, it is possible to prevent a mistaken decision based upon an unstable state after the power supply has been turned ON. In other words, it is possible to prevent a mistaken decision that a lamp short which can be recovered, is a lamp short which cannot be recovered.

Figure 4:
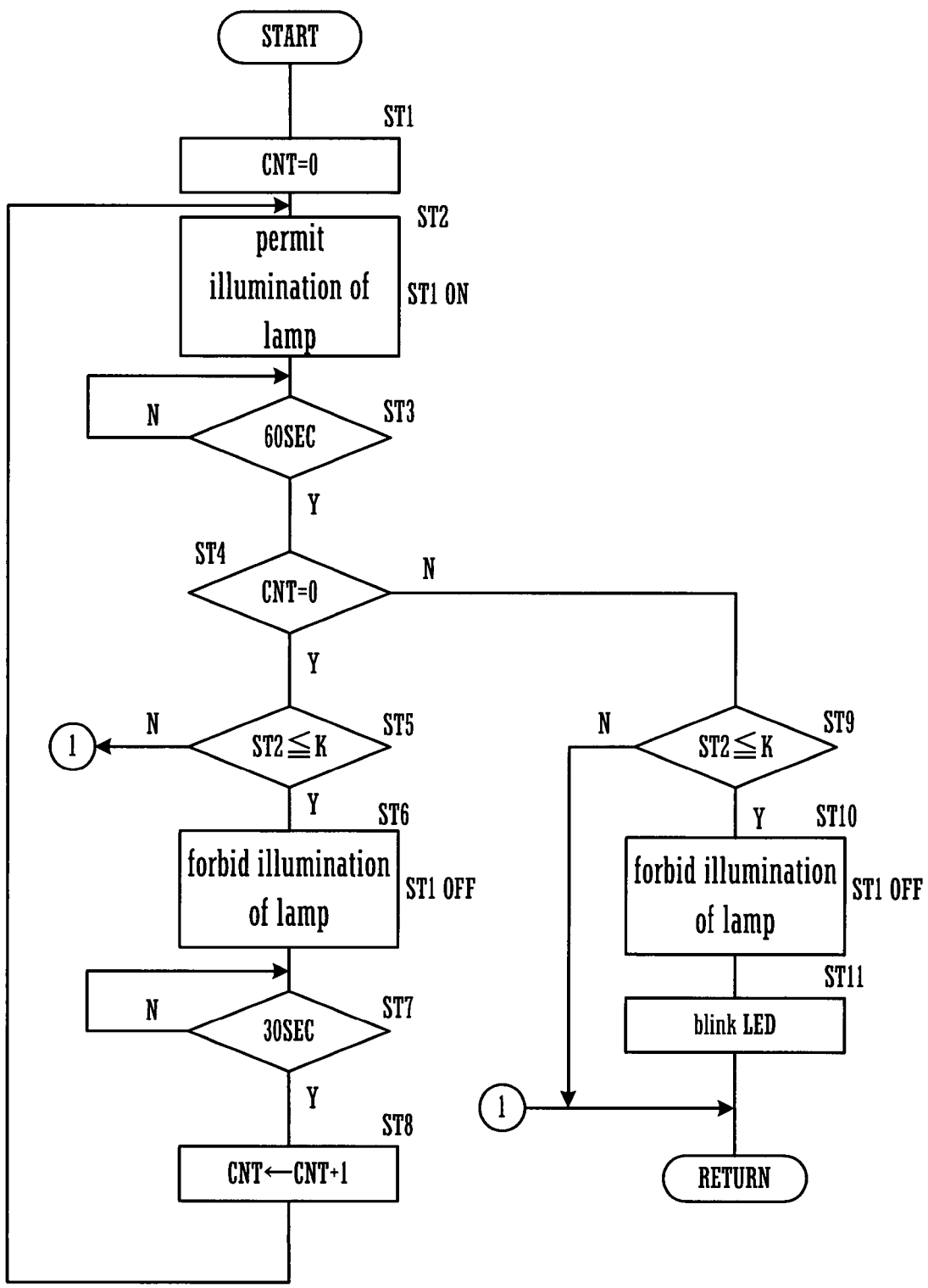
FIG. 4 is a flow chart showing the operation of the control unit when performing software processing.

FIG. 4 is a flow chart showing the operation of the control unit 8.

When the power supply is turned ON, in a step ST1, the value of a counter CNT is initialized (set to zero), and then in a step ST2 the signal S1 is set to "permit illumination of lamp". The system then waits in a step ST3 for one minute (a first predetermined time period). Then in a step ST4, if the value of the counter CNT is zero, the system transitions into the state #2. Next, in a step ST5, the system decides whether or not the pulse width of the PWM control signal is less than or equal to a predetermined width, in other words whether or not the signal S2 is at a level which indicates shorting out of the lamp 1 (i.e. the system makes a decision as to whether or not the signal S2 is less than or equal to a predetermined level K). If the signal S2 is at a level which indicates shorting out of the lamp 1, then in a step ST6 the signal S1 is set to "forbid illumination of lamp". Then, after waiting for 30 seconds (a second predetermined time period) in a step ST7, the system increases the counter CNT by 1 and repeats the steps for the first state #1, from the step ST2.

If in the step ST4 the value of the counter CNT is not zero, then the system goes into the state #3, and the flow of control is transferred to a step S9. In this step ST9 and a subsequent step ST10, in the same manner as in the previous steps ST5 and ST6, a decision is made as to whether or not the signal S2 is at a level which indicates shorting out of the lamp 1, and, if indeed the signal S2 is at a level which indicates shorting out of the lamp 1, then illumination of the lamp 1 is not permitted.

Furthermore, in the next step ST11 for this state #3, the LED 12 is blinked in order to indicate an error.

Although, in the embodiment described above, in the state #3, the system sets "forbid illumination of lamp" if the signal S2 is at a level which indicates shorting out of the lamp 1, it would also be acceptable to perform control so as to reduce the power supplied to the lamp, instead of setting "forbid illumination of lamp". For example, when constant power control at a level of 200 W is being performed, it would be possible to change over to constant power control at 50 W if the signal S2 is at a level which indicates shorting out of the lamp. Since by doing this it is possible to alleviate the load upon the lamp drive circuit even if the shorting out of the lamp continues, accordingly it is possible to prevent damage being caused thereby. Moreover, if the lamp recovers from its shorting out after a certain time period has elapsed, then it is desirable to continue processing at a lower supplied power for the lamp, instead of forbidding illumination of the lamp. It should be understood that, in order to lower the power supplied to the lamp 1 instead of forbidding illumination of the lamp, in FIG. 1, it is effective to shorten the pulse width of the PWM control signal with the lamp drive circuit 4.

What is claimed is:

1. A lamp drive device of a projector, comprising:
   a lamp which projects light towards an image formation unit;
   a lamp power supply unit which supplies a lamp drive current to said lamp;
   a switching element connected in series with said lamp;
   a lamp drive current detection circuit which detects the magnitude of said lamp drive current;
   a lamp drive circuit which, based upon the output of said lamp drive current detection circuit, ON/OFF drives said switching element with a PWM control signal, so that said lamp is driven at constant power;
   a lamp shorted out decision circuit which, based upon said PWM control signal, decides whether or not said lamp is in a shorted out state; and
   a display section which displays said shorted out state;
   wherein said lamp shorted out decision circuit comprises:
   a pulse width detection means which detects the pulse width of said PWM control signal after the driving of said lamp has been started;
   a lamp drive ON/OFF means which, if said pulse width detected by said pulse width detection means is less than or equal to a predetermined width, stops the driving of said lamp, and thereafter starts driving of said lamp for a second time; and
   a decision means which, after the driving of said lamp by said lamp drive ON/OFF means has been started for a second time, decides that said lamp is in said lamp shorted out state, if said pulse width detected by said pulse width detection means is less than or equal to a predetermined width.

2. A lamp drive device of a projector as described in claim 1, wherein said pulse width detection means detects the pulse width of said PWM control signal, when a first predetermined time period has elapsed after the driving of said lamp has been started.

3. A lamp drive device of a projector as described in claim 2, wherein said lamp drive ON/OFF means starts the driving of said lamp for a second time, when a second predetermined time period has elapsed after the driving of said lamp has been stopped.

4. A lamp drive device of a projector as described in claim 1, further comprising a smoothing circuit which smoothes said PWM control signal, and wherein said pulse width detection means detects said pulse width based upon the output level of said smoothing circuit.

5. A lamp drive device of a projector as described in claim 1, wherein said lamp drive circuit drives said switching element so as to drive said lamp at a low constant power, when said lamp shorted out decision circuit decides that said lamp is in said lamp shorted out state.

* * * * *